May 22, 1956 C. E. MILLER 2,747,014
DUPLEX FACSIMILE APPARATUS
Filed Oct. 2, 1950
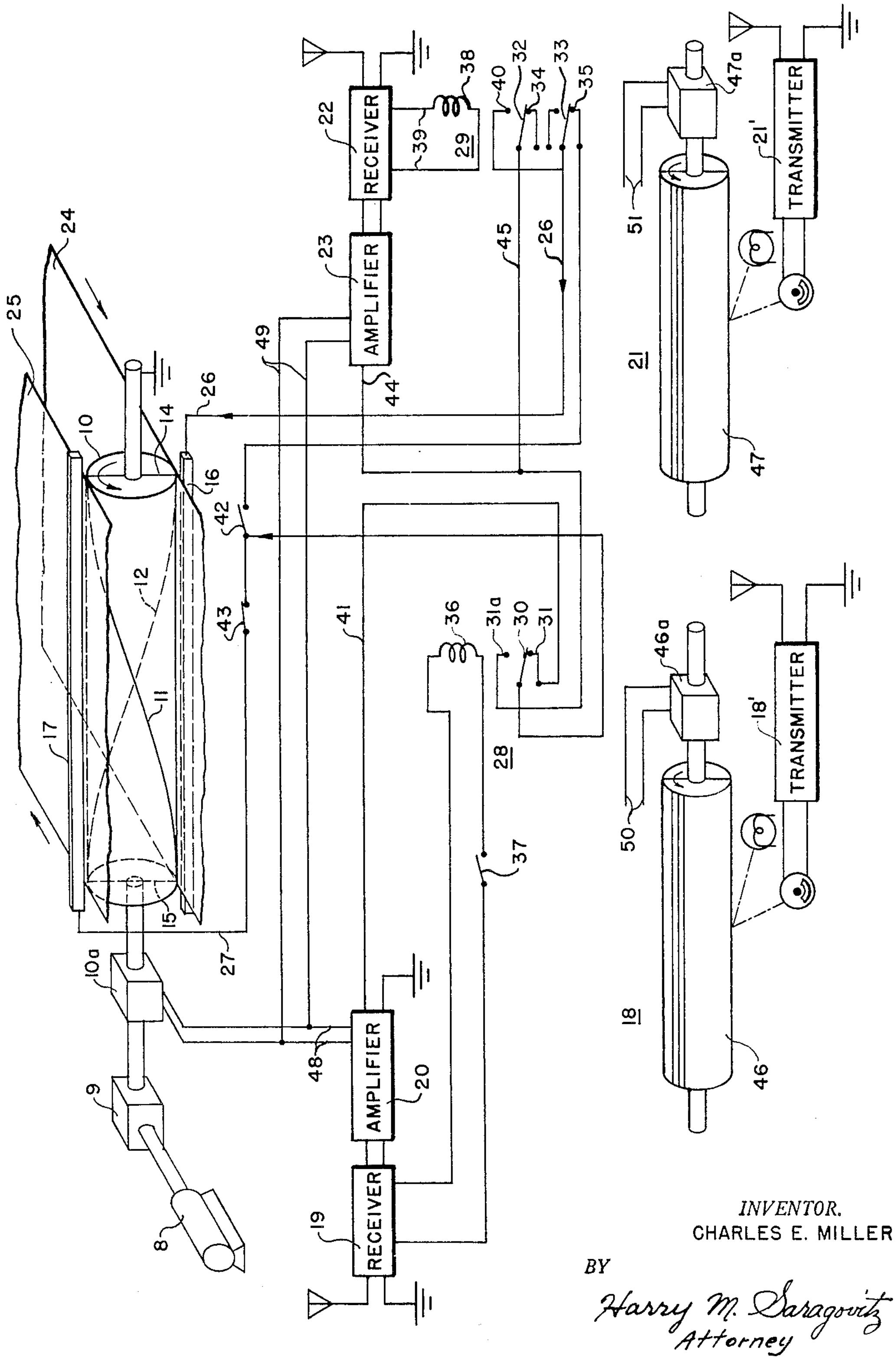
INVENTOR.
CHARLES E. MILLER
BY
Harry M. Saragovitz
Attorney // United States Patent Office 2,747,014

Patented May 22, 1956

2,747,014

DUPLEX FACSIMILE APPARATUS

Charles E. Miller, Fair Haven, N. J.

Application October 2, 1950, Serial No. 188,046

1 Claim. (Cl. 178—6.6)

(Granted under Title 35, U. S. Code (1952), sec. 266)

The invention described herein may be manufactured and used by or for the Government for governmental purposes, without the payment of any royalty thereon.

This invention relates to improvements in duplex facsimile apparatus, and more particularly to a facsimile recorder comprising a double-helix or multi-helix drum and as many respective associated printing bars.

It has been proposed heretofore to provide a facsimile system wherein two different facsimile transmissions, from two transmitting stations geographically separated, may be carried out simultaneously; wherein both of such transmissions are combined and transmitted over a common channel; and wherein at the receiving station the two transmissions are utilized by a duplex recorder to produce separate facsimile recordings on opposite sides, respectively, of the recording paper; both transmitters and the duplex recorder common thereto being operated in synchronism and in phase. An example of such a system for the simultaneous recording, by a single recording machine, of the separate facsimile transmissions from two geographically-separated transmitting stations, is disclosed in Patent No. 2,215,806, issued September 24, 1940, to Charles J. Young. Another example of duplex facsimile apparatus employing similar operating technique is disclosed in Patent No. 2,213,876, issued September 3, 1940, to the same patentee.

One of the objects of the invention is to provide duplex facsimile apparatus and a control system or arrangement therefor, whereby it is not only possible to receive and record simultaneously two separate facsimile transmissions on one and the same recorder at a distant receiving station, as heretofore, but wherein there are additional advantages in the way of greater flexibility of operation and control to effect recording of either one copy or two copies simultaneously from any one of several signal sources, or simultaneously to effect recordings of two separate facsimile transmissions, or automatically to effect recording of signals from one signal source without interruption of or interference with a recording which said apparatus might at the same time be making of a facsimile transmission from another signal source.

Other objects and advantages will hereinafter appear.

For the purpose of illustrating the invention, an embodiment thereof is shown in the drawing which is a simplified view, partly diagrammatic and partly isometric, of a duplex facsimile recorder and system constructed and operating in accordance with the invention, some of the conventional parts and units being removed for the sake of simplicity of illustration of the novel features claimed herein.

In the drawing, the reference numeral 10 designates a recorder drum supported for rotation about its longitudinal axis, and provided with a pair of helixes 11 and 12 each of electrically-conductive material and each embracing one-hundred-eighty degrees of the drum circumference. The helixes are electrically connected, as represented by the connections 14 and 15, and the respective ends of the helixes, at each drum end, are disposed at diametrically-opposite points on the drum surface, as shown.

Two electrically-conductive printer bars 16 and 17 are supported adjacent to the drum surface in parallel relation to the longitudinal axis about which the drum rotates, and are disposed on diametrically-opposite sides of this axis.

In operation of the improved system, signals which may be transmitted from a given transmitting station or signal source 18 are applied to the recorder apparatus from receiver 19 and an associated amplifier 20, while signals which may be transmitted from another transmitting station or signal source 21 are applied to the same recorder apparatus from a receiver 22 and an associated amplifier 23.

The recording action is comparable to that in electroplating. Electrosensitive paper 24 is fed through the recorder apparatus with the usual intermittent movement, and passes between the drum 10 and bar 16. Also, electrosensitive paper 25 is similarly fed through the recorder apparatus with an intermittent movement, and passes between the drum 10 and bar 17, but in the direction opposite to the movement of paper 24, as indicated by the arrows.

In the disclosed embodiment of the invention, the recording action is electrolytic, as in the Young Patent No. 2,215,806 referred to. That is, when an incoming signal from line 26 is applied to bar 16, a discoloration of paper 24 is effected at the incremental area thereof which, at the instant, is at the theoretical intersection of bar 16 and one of the helixes 11 and 12. In like manner, when an incoming signal from line 27 is applied to bar 17, a discoloration of paper 25 is effected at the incremental area thereof which, at the instant, is at the theoretical intersection of bar 17 and one of the helixes 11 and 12.

Associated, respectively, with the receivers 19, 20 and 22, 23 are relays 28 and 29, each of which is spring-biased to the positions shown so that switch-arm 30 normally engages contact 31 and switch-arms 32 and 33 normally engage contacts 34 and 35, respectively. The coil 36 of relay 28 is controlled by a switch 37, and may be supplied from a selenium rectifier or other voltage source in receiver 19.

Excitation of the coil 38 of relay 29 is automatic. As represented by the connections 39, coil 38 is supplied from receiver 22 which is tuned for stand-by reception from the transmitting station 21 operating at a frequency different than that at which the transmitting station 18 is operating. The relay coil 38 automatically becomes energized when receiver 22 responds to a transmission from station 21. The connections at contacts 34 and 35 are thereby opened, and switch-arm 32 is engaged with contact 40.

In the following explanation of the manner of operation and control of the improved system, it will be assumed that receiver 19, 20 is tuned to the transmitting station 18, and that receiver 22, 23 is tuned to the transmitting station 21.

To enumerate the various possibilities in the improved system (it will be seen, first, that with the various parts in the respective positions thereof shown in the drawing, signals transmitted from station 18 will be intercepted by receiver 19, 20 and applied to printer bar 17 by way of connection 41, contact 31, switch-arm 30, the closed switch 43, and line 27. Recording of the facsimile message from station 18 will accordingly be made on the electrosensitive paper 25. If the switch 42 is now closed, the output signals from amplifier 20 will be applied also to printer bar 16 by way of connection 41, contact 31, switch-arm 30, switch 42, contact 35, switch-arm 33, and line 26. A recording which is a duplicate of that being made on paper 25, is thereby simultaneously made on the electrosensitive paper 24. This manner of control suggests a second possibility, which is that a message from any station such as 18 may be recorded either on paper 24 or on paper 25. For example, with the receiver 22, 23 cut off, and with switch 42 open and relays 28 and 29 and switches 37 and 43 in the positions shown, output signals from amplifier 20 are applied only to printer bar 17 by way of connection 41, contact 31, switch-arm 30, switch 43, and line 27. The recording, therefore is made only on paper 25. To change over to paper 24, switch 43 is opened to cut out printer bar 17. Also, switch 37 and relays 28 and 29 are left in the positions thereof shown, but switch 42 is closed. The signals intercepted from transmitter 18 will then be applied to printer bar 16 by way of connection 41, contact 31, switch-arm 30, switch 42, contact 35, switch-arm 33 and line 26; whereupon the recording is made on paper 24 instead of on paper 25. By means of such control, it is possible to divide the work-load between printing bars 16 and 17 and their respective associated parts, when there is required but a single recording from any particular transmitting station to which receiver 19, 20 might be tuned.

A third possibility in the improved system is attributable to an automatic action furnished by relay 29. The purpose is to provide for the recording on paper 25, as explained, of a facsimile transmission from a station such as 18, while at the same time providing for a stand-by performance of the recording apparatus. For example, if there occurs an anticipated facsimile transmission from another station such at 21, to which receiver 22, 23 is tuned, the apparatus will function to record simultaneously, but on paper 24, this second transmission from station 21 without in any way interfering with or interrupting the occurring recording on paper 25 of the facsimile transmission from station 18. With the control switches in the respective positions thereof shown in the drawing, a facsimile transmission from station 18 will be intercepted by receiver 19, 20 and the corresponding signals applied to printer bar 17 to effect recording of the transmission from station 18 on paper 25, as before. During such time, if a station such as 21 starts to transmit, the stand-by receiver 22, 23 which is tuned to the latter, becomes effective to cause automatic excitation of coil 38 to operate relay 29. The facsimile transmission intercepted from signal source 21 is then applied to bar 16 by way of connections 44 and 45, switch-arm 32, contact 40, and line 26. A recording of the transmission from station 21 is thereby made on paper 24. A safety feature resides in the fact that even if switch 42 happens to be closed inadvertently at this time, there will be no interference between the respective signals from amplifiers 20 and 23 because switch-arm 33 is now disengaged from contact 35. This illustrates still another possibility in the operation of the improved system, which is that of obtaining a duplicate recording on paper 25 of a facsimile transmission from station 21 being made on paper 24. For example, with the receiver 19, 20 cut off, and with switch 37 closed to excite coil 36 and operate relay 28, the output signals from amplifier 23 will also be applied to bar 17 by way of connection 44, contact 31*a*, switch-arm 30, switch 43, and line 27.

Still another possibility in the operation of the improved system, is that of obtaining a duplicate recording on papers 24 and 25 of signals received by receiver 19, 20, while at the same time maintaining the stand-by feature of receiver 22, 23 so that a signal received on receiver 22, 23 will disconnect the signal applied to paper 24 from receiver 19, 20 and apply the signal received on receiver 22, 23 to paper 24. For example, with the receiver 19, 20 applying a received signal through line 41, contact 31, switch-arm 30, switch 43 and line 27 to bar 17 and simultaneously through switch 42 in its closed position, contact 35, switch-arm 33 and line 26 to bar 16, it is seen that the signal received on 19, 20 is applied to both papers 24 and 25. If during this time a station such as 21 starts to transmit, the standby receiver 22, 23 which is tuned to the latter, becomes effective to cause automatic excitation of coil 38 and operate relay 29. The signals intercepted from station 21 are then applied from receiver 22, 23 to bar 16 by way of lines 44 and 45, switch-arm 32, contact 40 and line 26. Upon excitation of coil 38, switch-arm 33 is moved away from contact 35, thus disconnecting receiver 19, 20 from bar 16.

The recorder drum 10 is rotated by a synchronous motor 8 supplied from a 60-cycle supply which may be the same as that supplying each of the synchronous motors (not shown) which drive the scanner drums 46 and 47. The recorder drum 10, however, is rotated at one-half the speed of drums 46 and 47 by means of a reduction gear-train or other suitable means represented at 9. Assuming that the controls are set for the recording on paper 25 of the transmission from station 18; it will be apparent that during any one 360° revolution of the scanning drum 46, one line of a transmission from station 18 will be recorded on paper 25 by the cooperative action of bar 17 and that one of the two helixes 11 and 12 which, at the time, is being swept past bar 17. During the succeeding 360° revolution of drum 46, the occurring succeeding line of the transmission from station 18 will be recorded on paper 25 by the cooperative action of bar 17 and the other one of the two helixes 11 and 12.

In like manner, and for the same reason, and assuming that the controls are set for the recording on paper 24 of the transmission from station 21; during any one 360° revolution of the scannig drum 47, one line of a transmission from station 21 will be recorded on paper 24 by the cooperative action of bar 16 and that one of the two helixes 11 and 12 which, at the time, is being swept past bar 16. During the succeeding 360° revolution of drum 47, the occurring succeeding line of the transmission from station 21 will be recorded on paper 24 by the cooperative action of bar 16 and the other one of the two helixes 11 and 12.

Transmission of the facsimile or picture signals from transmitting stations 18 and 21 to the single recorder apparatus may be via wire line or radio channel, and in a conventional manner well known in the art.

With the respective driving motors for drums 10, 46, and 47 supplied from a 60-cycle source, they will rotate synchronously, and if there is 60-cycle power supply common to these motors, the respective drums driven thereby will remain in phase.

For the purpose of otherwise maintaining each of the three drums in phase with each of the other two, suitable phase or framing pulses may be transmitted from an independent, master station, or from either one of the transmitting stations 18 and 21. In the latter case, phase pulses transmitted from station 18, for example, would be intercepted at the receiving station and at the stand-by station 21, and utilized thereat in any well known manner to maintain the respective drums 10 and 47 in phase with drum 46. In this connection, reference is made to Patent No. 2,257,918, issued October 7, 1941, to Hugh C. Ressler, and to Patent No. 2,404,571, issued July 23, 1946, to William G. H. Finch. If the drums are phased by a conventional type of clutch represented, respectively, at 10*a*, 46*a*, and 47*a*, phasing or framing signals received from a master station, for example, are applied to clutch 10*a* by way of connections 48 and 49, to clutch 46*a* by way of connections 50, and to clutch 47*a* by way of connections 51. Such signals may be produced and transmitted in a conventional manner with the picture signals from conventional transmitters forming part of the transmitting equipment at stations 18 and 21 and designated, respectively, by the reference numerals 18′ and 21′.

Examples of details of structure and arrangement which might be employed in practicing the invention are shown in the patents referred to above. Reference is also made to Reissue Patent No. 20,152, issued October 27, 1936, to Charles J. Young; to Patent No. 2,376,888, issued May 29, 1945, to Raleigh J. Wise; to Patent No. 2,415,718, issued February 11, 1947, to Edward S. Wilson et al.; and to War Department Technical Manual identified as TM11–375B and relating to facsimile equipment RC–120, RC–120–A and RC–120–B, and to facsimile set AN/TXC–1.

It will be seen from all the foregoing that in the improved system there are a number of posibilities, the selection of any one of which can be effected readily by the manipulation of switches 37, 42, and 43, and by the tuning of receivers 19, 20 and 22, 23; as explained. To summarize some of the more important of these possibilities, one is that a recording which is a duplicate of that being made on paper 25 can be made simultaneously on paper 24, and vice versa; another is that a message from any station, such as 18, may be recorded either on paper 24 or on paper 25; and still another is that with a recording being made on paper 25 of the transmission from any station such as 18 to which receiver 19, 20 is tuned, the apparatus will automatically function to record simultaneously on paper 24 the transmission from another station such as 21 to which receiver 22, 23 might be tuned, and without interrupting or interfering with the occurring recording on paper 25.

While but one embodiment of the invention has been disclosed herein, it will be understood by those skilled in the art that various modifications, such as in the size, shape and arrangement of the parts, are possible without departing from the spirit of the invention, or the scope of the claims.

The invention claimed is:

Facsimile receiving apparatus comprising a single printing drum, first and second independently operable electrically conductive imprinting bars positioned parallel to the axis of said drum and at diametrically opposite points closely adjacent to the periphery of the drum, spiral imprinting ribs on the surface of said drum each occupying 180° of the periphery thereof, electrosensitive sheets disposed between said imprinting bars and the said spiral ribs, a first signal receiver, a normally closed relay switch connected in the output lead from said first receiver, connections from the switch to both of said imprinting bars, manual switches in the said connections to said bars, power leads from said first receiver to the coil on said relay, said leads being continuously energized while power is fed to the receiver, a manual switch in said power leads, a second signal receiving element, a second relay having its coil connected to said second receiver, means in said second receiver acting to energize said coil only when the receiver is receiving signals, switches on said second relay acting to open the connection leading from said first receiver to the second imprinting bar and acting simultaneously to close a normally open circuit from the output of said second receiver to said second imprinting bar, a switch on said first relay normally closing the lead from the output of the first receiver to the printer bars and acting when the relay is energized to connect the output of the second receiver to the said straight printer bars and disconnect the first receiver therefrom, whereby facsimile records may be made upon the two electrosensitive papers from one or both of said receivers either one at a time or simultaneously by manipulating said manual switches.

References Cited in the file of this patent

UNITED STATES PATENTS

| | | |
|---|---|---|
| 1,800,031 | Schroter | Apr. 7, 1931 |
| 1,918,124 | Nicolson | July 11, 1933 |
| 1,925,814 | Nicolson | Sept. 5, 1933 |
| 2,066,672 | Berard et al. | Jan. 5, 1937 |
| 2,213,876 | Young | Sept. 3, 1940 |
| 2,246,284 | Artzt | June 17, 1941 |
| 2,380,482 | Tribble | July 31, 1945 |
| 2,527,599 | Terry | Oct. 31, 1950 |
| 2,529,978 | Thompson | Nov. 14, 1950 |